W. M. CLONINGER.
VEHICLE LAMP.
APPLICATION FILED APR. 22, 1915.
1,200,587.
Patented Oct. 10, 1916.
2 SHEETS—SHEET 2.
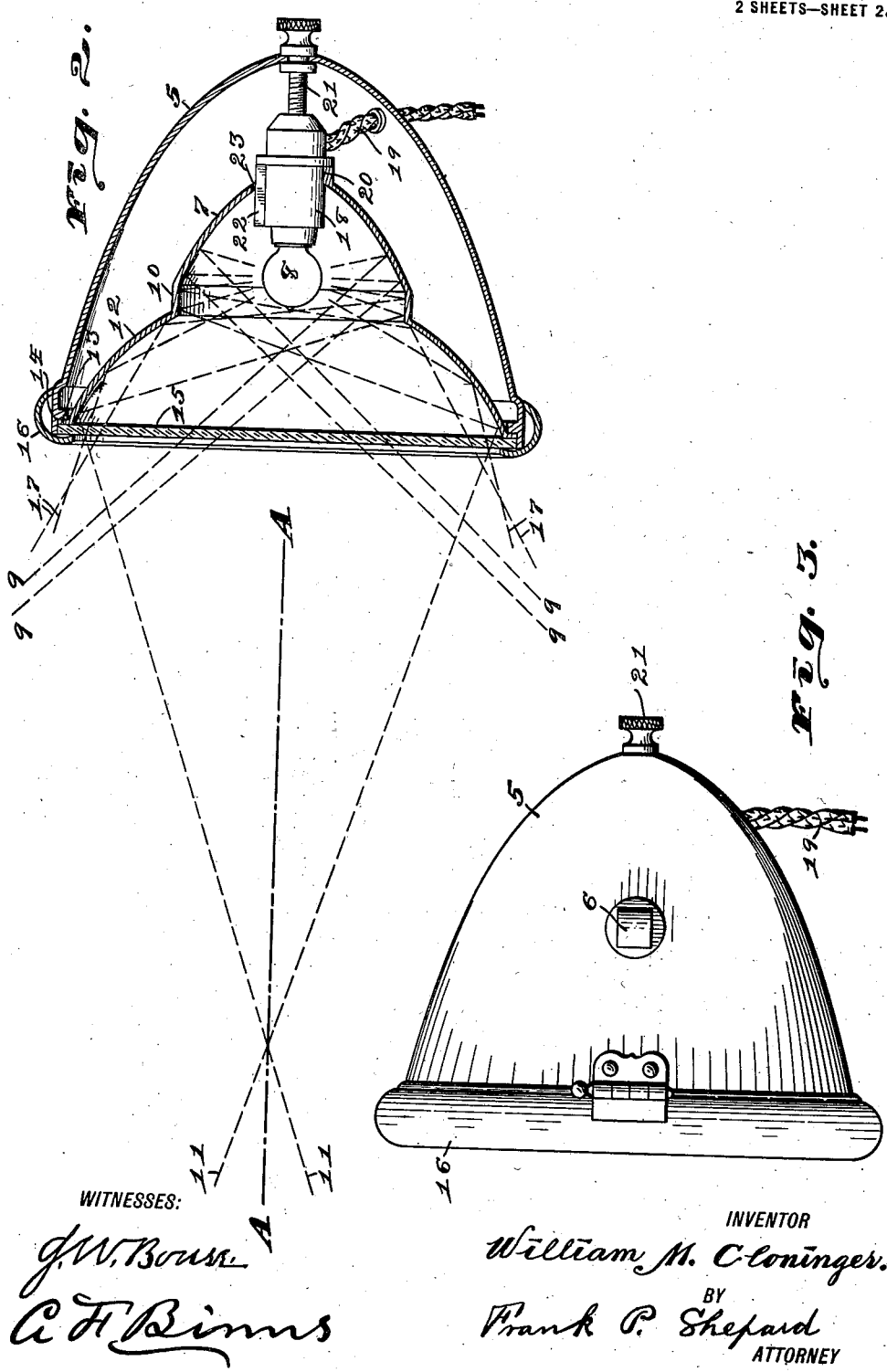
WITNESSES:
INVENTOR
William M. Cloninger.
BY
Frank P. Shepard
ATTORNEY

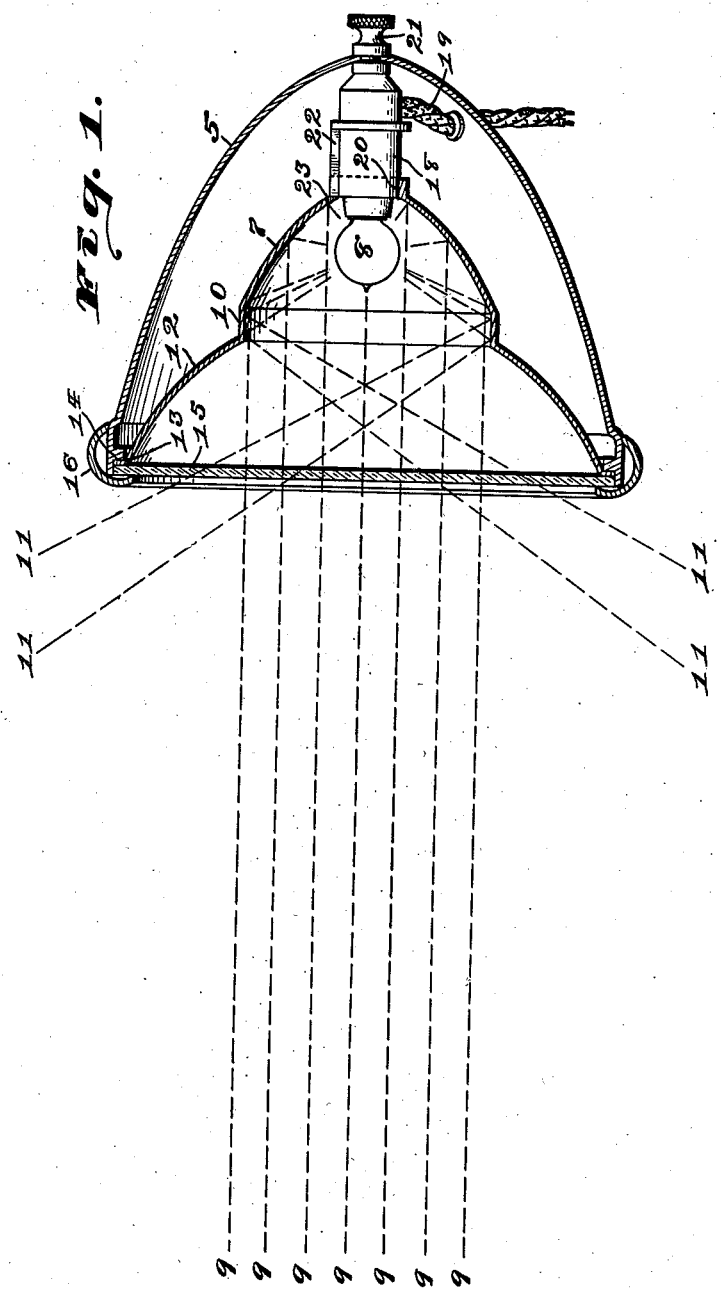

UNITED STATES PATENT OFFICE.

WILLIAM M. CLONINGER, OF OKLAHOMA, OKLAHOMA, ASSIGNOR OF ONE-HALF TO C. W. WHITE, OF WACO, TEXAS, AND ONE-HALF TO LEOPOLD HARTH, OF FORT WORTH, TEXAS.

VEHICLE-LAMP.

1,200,587.  Specification of Letters Patent.  Patented Oct. 10, 1916.

Application filed April 22, 1915. Serial No. 23,015

*To all whom it may concern:*

Be it known that I, WILLIAM M. CLONINGER, a citizen of the United States, residing at Oklahoma city, in the county of Oklahoma and State of Oklahoma, have invented certain new and useful Improvements in Vehicle-Lamps, of which the following is a specification, reference being had to the accompanying drawings.

The invention pertains to lamps in which reflectors are employed behind the source of light to direct the light rays.

An object of the invention is to provide improved means for varying and controlling the direction of the light rays.

Other objects and advantages of the invention will be set forth in the ensuing description.

The accompanying drawings show one embodiment of the invention in practical form.

Figure 1 is a sectional view of the lamp taken on a line which includes the axis line or central light ray. Fig. 2 is a reproduction of Fig. 1, but with the source of light shifted with respect to the mirrors. Fig. 3 is an exterior view of the lamp, the left-hand side of all the figures being the front.

The axis line or central ray is indicated by the line A—A in Fig. 2, but is omitted in Fig. 1 to avoid confusion of lines; and for purposes of this description it is immaterial whether the views shown by the figures be taken as looking downward or in a horizontal direction.

Referring to the several figures, in all of which like characters of reference designate like parts, the lamp shown includes a supporting shell 5, which is open at its front and may be provided on its outside with one or more lugs 6 for attaching it to a vehicle. A small convex mirror 7 is mounted in the rear portion of the shell 5 and axially coincident therewith, this mirror being supported by means later described and being a support for certain parts which hold a source of light 8. This mirror 7 is so shaped that with the source of light 8 in the rearmost position shown in Fig. 1 the reflected rays from said mirror are on substantially parallel lines 9 as shown in said figure. Beginning at the front termination of the mirror 7, a substantially cylindrical mirror 10 extends forward a short distance as shown, and with the source of light 8 in its rearmost position this mirror 10 reflects the rays from said source across the central or axis ray at an angle of, say, sixty degrees with said axis ray as shown by the lines 11 in Fig. 1, thereby affording sufficient lateral illumination in addition to the "spot" light of the parallel rays 9. Beginning at the front termination of the cylindrical mirror 10, a mirror 12, which may be spherical, flares outward and forward, this mirror 12 being so positioned with respect to the mirror 10 that practically no light can reach it when the source of light 8 is in the rearmost position shown in Fig. 1. To support the three mirrors 7, 10, and 12, they may be formed integrally, the latter one 12 having at its front edge a flange 13 which seats in a rabbet 14 at the front of the shell 5. For protection of the mirrors and light, the usual glass plate 15 is seated in the rabbet 14 in front of the front mirror 12, and this plate is held removably in place by an annular door 16 which is hinged to the shell 5 and forced to closed position with a tight embracing fit.

When only general and more equal illumination throughout the lighting range of the lamp is required, the light source 8 may be shifted forward to or toward the foremost position shown in Fig. 2. With the light 8 in this position, the rays reflected from the rear mirror 7 cross the central or axis ray at an angle for wide illumination, while the rays reflected from the cylindrical mirror 10 are reflected across to the front mirror 12 and then reflected back across the mirror 12 at a small angle therewith. With axis ray at a small angle therewith. With the source of light 8 in foremost position, rays also pass directly from it to the front mirror 12 and are reflected thereby as shown by the lines 17 in Fig. 2.

Within the meaning and intent of the invention, the rear mirror 7 may have any curve adapted to reflect the rays substantially parallel for spot light purposes, such, for example, as the parabolic curve. Since the parabolic curve of the mirror 7 can not nearly approach the cylindrical form of the mirror 10 without extending too far forward for practical purposes, an angle will necessarily mark the boundary between said mirrors, the mirror 10 being cylindrical, or nearly so, in order to reflect the rays onto the mirror 12 when the light 8 is in foremost position. The source of light 8 may be a small electric light bulb which is supported in the front end of an elongated socket 18, the wiring 19 for said bulb passing from any suitable source of current through the wall of the shell 5 and into said socket. The socket 18 is mounted axially coincident with the axis line A—A or central ray of the lamp and is slidably fitted in a rearwardly-flanged central opening 20 of the rear mirror 7. A screw 21 which is journaled in the extreme rear end of the shell 5 has screwthreaded engagement with the rear end of the socket 18, and by turning this screw said socket can be moved forward or backward to bring the light bulb to the different positions described. A longitudinal tongue 22 on the socket 18 slides in a notch 23 in the opening 20 of the mirror 7 and prevents rotation of the socket under action of the screw 21.

Having thus described the invention, I claim:—

1. A lamp including a central reflector of a curvature to reflect parallel rays of light, an outer light dispersing reflector surrounding the mouth of the central reflector and flaring outwardly therefrom, a source of light, and means for moving the source of light to position it at the focus of the central reflector or at a point beyond the same, a spot light being obtained in the first instance, in which instance no rays fall on or are reflected by the outer reflector, while the light rays are dispersed laterally by both reflectors in the second instance.

2. A lamp including a central parabolic reflector, an outer light dispersing spherical reflector surrounding the mouth of the parabolic reflector and flaring outwardly therefrom, a source of light, and means for moving the source of light to position it at the focus of the parabolic reflector or at a point beyond the same, a spot light being obtained in the first instance, in which instance no rays fall on or are reflected by the outer reflector, while the light rays are dispersed laterally by both reflectors in the second instance.

3. A lamp including a central reflector of a curvature to reflect parallel rays, an outer light dispersing reflector surrounding the mouth of the central reflector and flaring outwardly therefrom, a third cylindrical reflector connecting the central reflector and outer reflector, a source of light, and means for shifting the source of light to position it at the focus of the central reflector or at a point beyond the same, a spot light being obtained in the first instance, while in the second instance the light rays are dispersed laterally by all of the reflectors.

4. A lamp including a central parabolic reflector, an outer light dispersing spherical reflector surrounding the mouth of the central reflector and flaring outwardly therefrom, a third cylindrical reflector connecting the outer reflector and the central reflector, a source of light, and means for moving the source of light to position it at the focus of the parabolic reflector or at a point in advance thereof, a spot light being obtained in the first instance, while in the second instance the light rays are dispersed laterally by all of the reflectors.

5. A lamp including a shell, an integral reflecting element arranged within the shell and formed with a parabolic central portion and a flared spherical outer portion, the edge of the outer portion being secured to the mouth of the shell, a source of light, means mounted upon the shell and operatively connected to the source of light for moving the same axially of the reflecting element to position it at the focus of the central portion thereof or at a point beyond the said focus, a spot light being obtained in the first instance, in which instance no rays fall on or are reflected by the outer reflector, while the light rays are dispersed laterally by both portions of the reflecting element in the latter instance.

Witness my hand this 29 day of April, 1915.

WILLIAM M. CLONINGER.

Witnesses:
 Geo. H. Willis,
 J. J. Novak.